United States Patent
Murdock et al.

[11] Patent Number: 6,010,174
[45] Date of Patent: Jan. 4, 2000

[54] SLIDING VISOR

[75] Inventors: Jay A. Murdock, Southgate; Edward G. Curtindale, Farmington Hills; Ryan E. Dillingham, Waterford, all of Mich.

[73] Assignee: Lear Automotive Dearborn, Inc., Southfield, Mich.

[21] Appl. No.: 08/837,173

[22] Filed: Apr. 14, 1997

[51] Int. Cl.[7] ........................................................ B60J 3/02
[52] U.S. Cl. ............................................................ 296/97.11
[58] Field of Search .................................. 296/97.4, 97.8, 296/97.11

[56] References Cited

U.S. PATENT DOCUMENTS

| | | | |
|---|---|---|---|
| 3,403,937 | 10/1968 | Quaine | 296/97.11 |
| 4,925,233 | 5/1990 | Clark | 296/97.11 |
| 4,982,992 | 1/1991 | Vu et al. | 296/97.6 |
| 5,004,288 | 4/1991 | Viertel et al. | 296/97.11 |
| 5,044,687 | 9/1991 | Abu-Shumays et al. | 296/97.11 |
| 5,071,186 | 12/1991 | Hemmeke et al. | 296/97.9 |
| 5,409,285 | 4/1995 | Snyder et al. | 296/97.11 |
| 5,538,310 | 7/1996 | Frankhouse et al. | 296/97.4 |
| 5,645,308 | 7/1997 | Fink | 296/97.9 |
| 5,653,490 | 8/1997 | Fink et al. | 296/97.11 |

FOREIGN PATENT DOCUMENTS 3324305  1/1985  Germany .

*Primary Examiner*—Andrew C. Pike
*Attorney, Agent, or Firm*—MacMillan, Sobanski & Todd, LLC

[57] ABSTRACT

A sliding visor includes a rod assembly and a visor body. The rod assembly includes a rod, a torque control, and a guide. The rod extends longitudinally. The torque control pivotally attaches to the rod. The guide is fixed to one side of the torque control. The visor body includes a bore and a track. The bore extends longitudinally between the channel and the rear edge of the visor body. The rod is received within the bore and extends into the visor body. The track extends longitudinally along the upper surface of the visor body. The track forms a substantially enclosed longitudinally extending passage adjacent the upper surface of the visor body. The passage is shaped to receive a portion of the guide. When the visor is moved longitudinally along the rod, the track slides with respect to the guide.

4 Claims, 4 Drawing Sheets

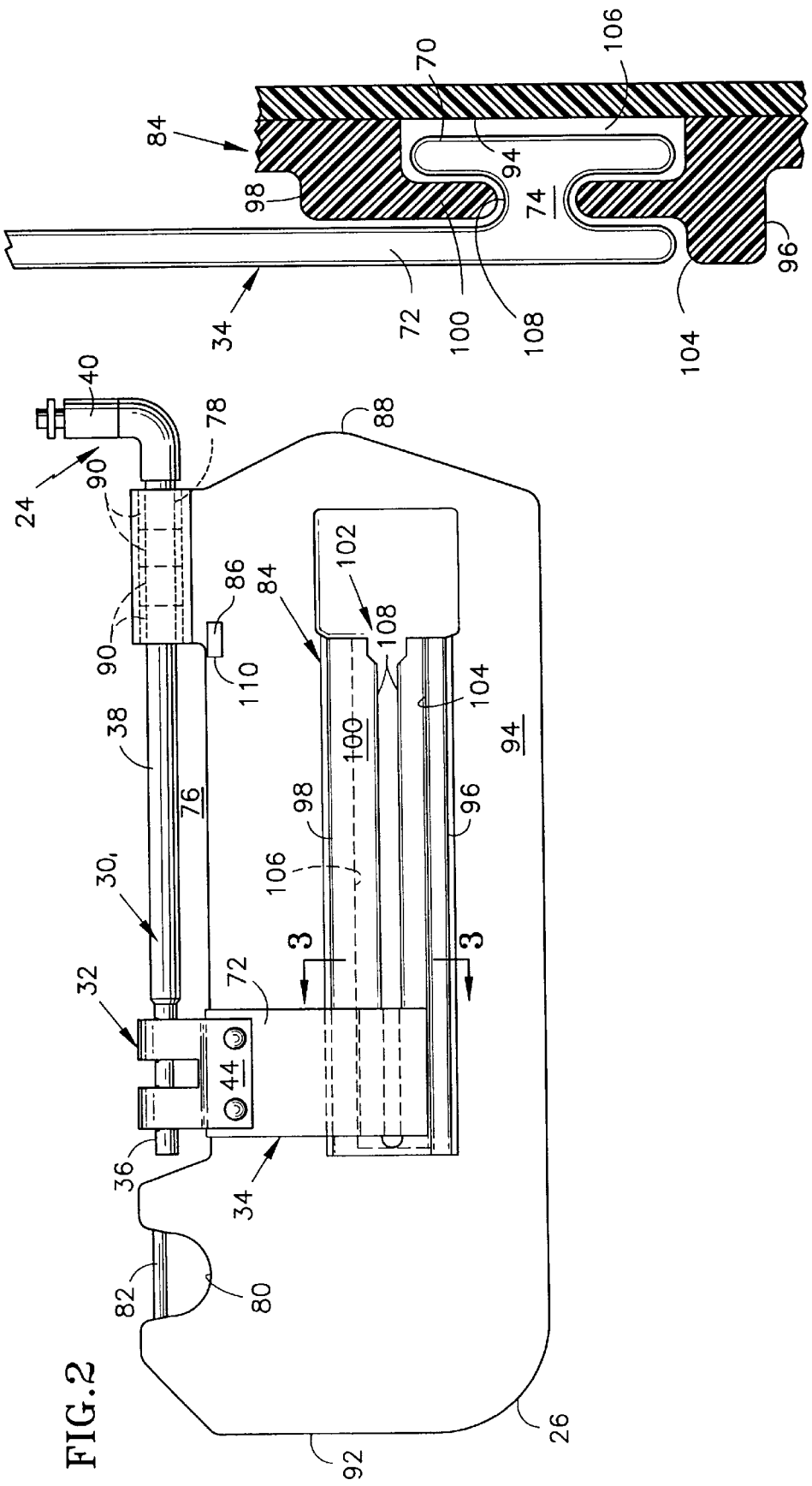

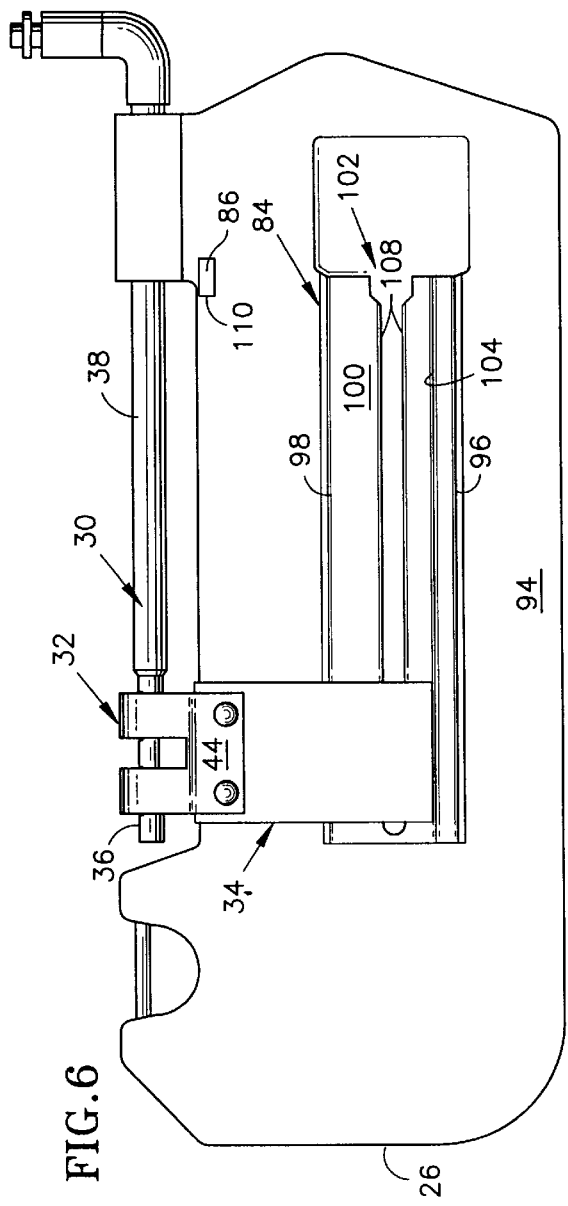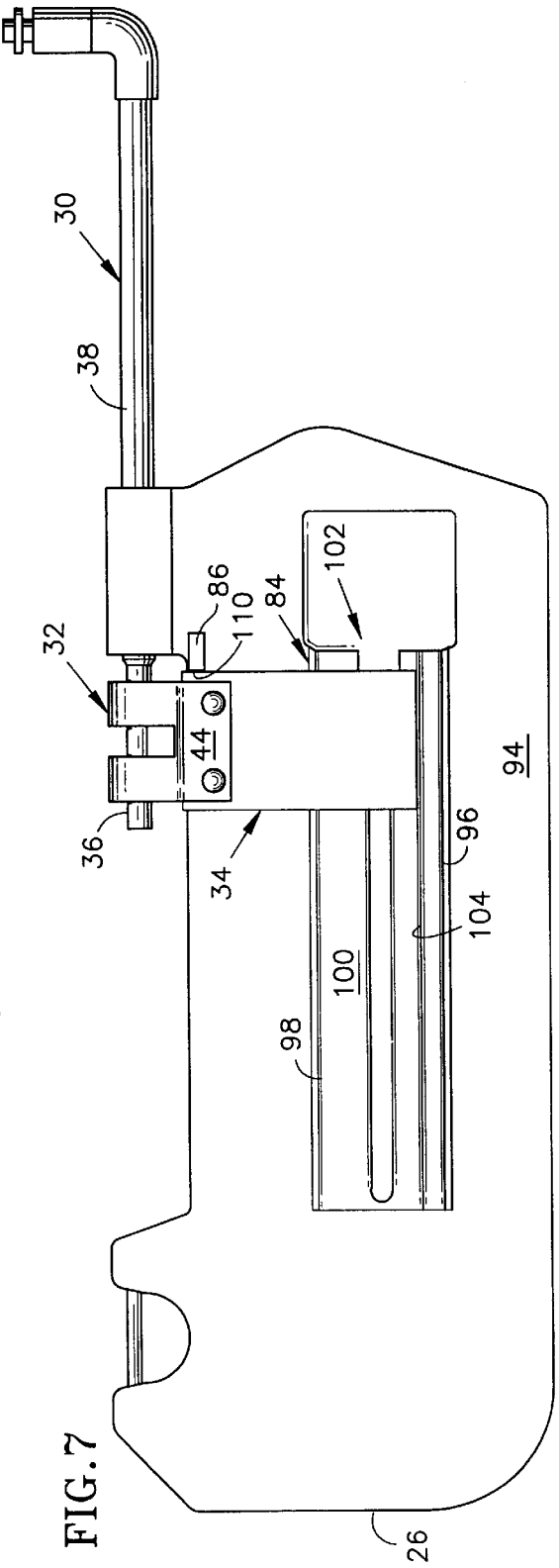

SLIDING VISOR

TECHNICAL FIELD

The present invention relates to a visor, and more particularly to a sliding visor for use in a vehicle.

BACKGROUND OF THE INVENTION

The passenger compartments of vehicles are usually equipped with sun visors. The visors are mounted on pivot rods. The visors rotate downwardly from a stored position against the headliner of the vehicle to various lower positions for shielding the eyes of the occupants from sunlight. A torque control rotatably attaches the visor to the rod. The torque control must hold the visor at the various positions, yet permit relatively easy adjustment of the visor. Some of such visors are laterally adjustable along the rod for enhanced shielding effectiveness.

A number of such visors have been proposed; however, they are problematic. A number of visors use a metal extrusion in which to house the torque control. The torque control slides within the extrusion. This type of apparatus requires numerous parts and therefore is costly.

Yet another visor design utilizes a visor with a guide means and a torque control. The guide means includes a plurality of parallel rails, a plurality of disks and a coupling means. The rails extend longitudinally on one surface of the visor. The torque control is disposed on the rails. The torque control has a longitudinally extending slot herethrough. The plurality of disks contact the other side of the torque control. The coupling means fastens the disks to the core. The coupling means extends through the slot in the torque control. The engagement of the torque control with the rails and disks allows the visor to be moved with respect to the torque control. This apparatus requires numerous parts, and therefore is costly.

Another visor design utilizes a visor with a L-shaped arm which extends outwardly from one surface of the visor core. The rod extends longitudinally along the visor core. A separate panel includes two spaced L-shaped arms which extend outwardly from the surface of the panel. When assembled the L-shaped arm on the visor interlocks with the L-shaped arms on the panel, so that these parts are in sliding engagement with one another.

Therefore, a sliding visor is sought, which can be rotated from a stored position to a use position, and which can be moved longitudinally along the rod. It is desired that the visor be aesthetically pleasing, and have a relatively simple design.

SUMMARY

According to an embodiment of the present invention, a sliding sun visor assembly includes a rod assembly, and a visor body. The rod assembly includes a rod, torque control, and a guide. The visor body includes a bore and a track.

The rod is placed through the visor body bore and extends longitudinally into the visor body. The torque control pivotally attaches to the rod. The guide is fixed to one surface of the torque control.

The track extends longitudinally on one surface of the visor body. The track forms a substantially enclosed longitudinally extending passage adjacent the surface of the visor body. The passage is shaped to receive a portion of the guide in a sliding engagement. Upon moving the visor longitudinally along the rod, the track slides relative to the guide, which allows the visor to be used in an extended or retracted position.

In one embodiment, the guide has a substantially H-shaped cross section.

The foregoing invention will become more apparent in the following detailed description of the best mode for carrying out the invention and in the accompanying drawings.

BRIEF DESCRIPTION OF THE DRAWING

FIG. 2 is a front partial view of the visor assembly shown in FIG. 1; the visor is in a lowered, retracted position with a cover removed for clarity.

FIG. 3 is a partial cross-sectional view along line 3—3 of FIG. 2 of a portion of the visor assembly.

FIG. 6 is a front partial view of the visor assembly shown in FIG. 2, the visor is in a lowered, retracted position with the cover removed for clarity.

FIG. 7 is a front partial view of the visor assembly shown in FIG. 2; the visor is in a lowered, extended position with the cover removed for clarity.

BEST MODE FOR CARRYING OUT AN EMBODIMENT THE INVENTION

Figure 1:
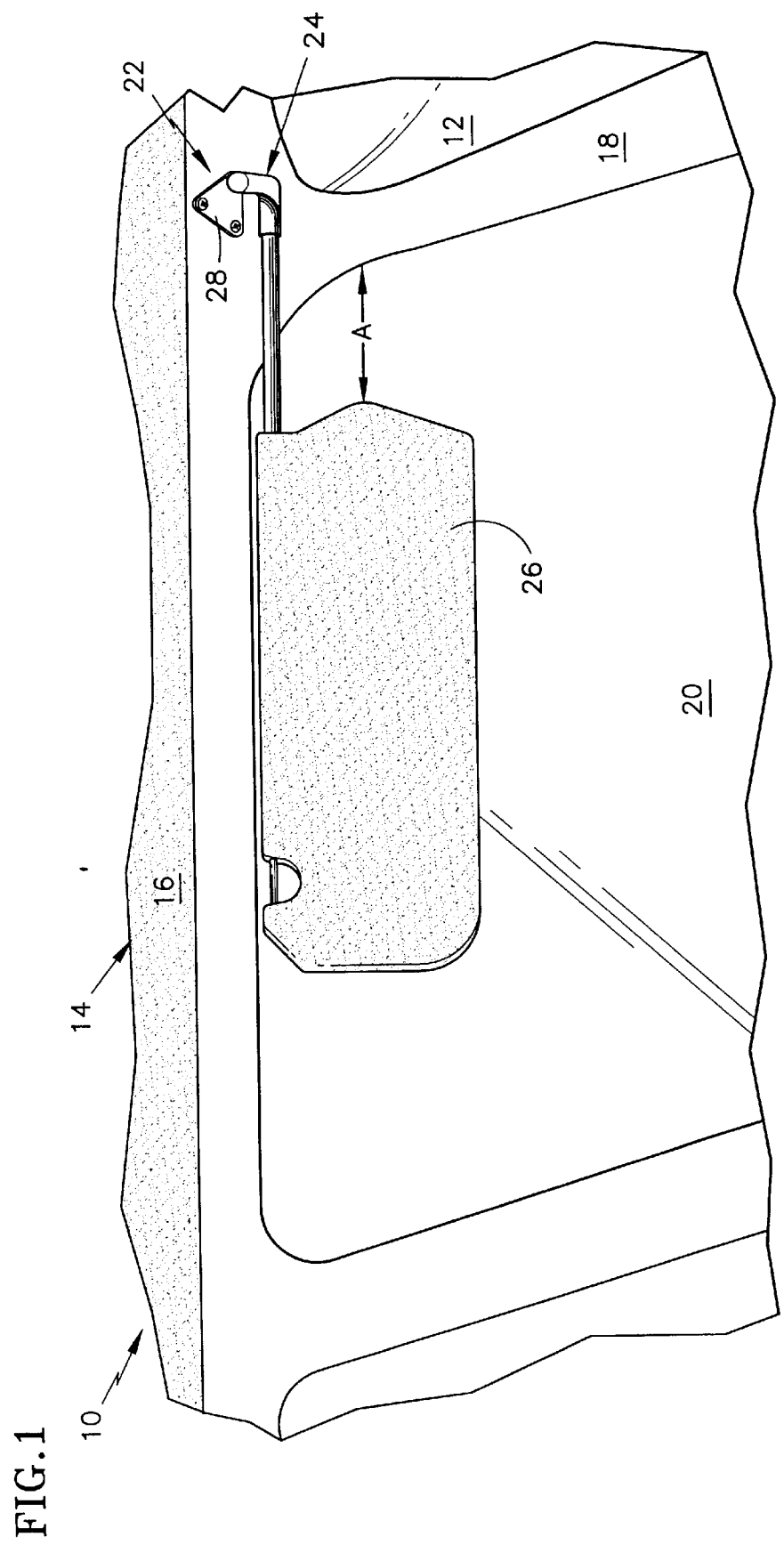
FIG. 1 is a fragmentary perspective view of a sun visor assembly embodying the present invention, the visor is in a lowered, extended position.

Referring to FIG. 1, a vehicle 10 includes a windshield 12 and a roof covered by a headliner 14 with an upholstered surface 16 to provide a trim appearance to the vehicle. The vehicle further includes an A-pillar 18 separating the windshield 12 and a side window 20. A sliding sun visor assembly 22 is shown on the driver's side of the vehicle.

The sliding sun visor assembly 22 includes a pivot rod assembly 24, and a visor body 26. The pivot rod assembly mounts the visor body 26 to the roof of the vehicle. The visor body can have a number of positions. In the lowered, extended position, the visor is adjacent the side window 20 and spaced from the A-pillar 18. As indicated by the arrow A, the visor body 26 can be moved from the extended position to the lowered, retracted position (as shown in FIG. 2) adjacent the side window 20 and the A-pillar 18. The visor body can be placed in a raised, stored position (not shown), where the visor is adjacent the headliner 14.

Referring to FIGS. 1 and 2, the pivot rod assembly 24 includes an elbow bracket 28, a L-shaped pivot rod 30, a torque control 32, and a guide or shoe 34. The elbow bracket 28 attaches to the roof of the vehicle and pivotally secures one end of the rod 30 to the vehicle.

The longitudinally extending pivot rod 30 includes a metal insert 36, which is molded into a plastic cover 38. The plastic cover 38 covers all but a portion of the metal insert 36. The metal insert 36 includes a plurality of lobes and flats (not shown) for cooperating with the torque control 32.

The end of the plastic cover 38 opposite the exposed portion of the metal insert includes a conical tower 40. The conical tower 40 allows the rod 30 to be snapped into a conventional elbow bracket 28.

The metal insert 36 may be formed from a low carbon steel, and can be extruded and bent. The flats and lobes (not shown) on the metal insert are formed using a coining process. The number of flats and lobes formed depends on the torque control used. The plastic cover 38 is formed from nylon or glass-filled nylon and is injection molded with the metal insert therein.

Referring to FIG. 2, the torque control 32 allows the visor body 26 to be moved between and held at various rotational positions with respect to the rod. The torque control 32 is piece of metal bent from a substantially U-shaped blank. The torque control 32 is pivotally attached to the metal insert portion of the rod by means of the lobes and flats and the geometry of the torque control. In this embodiment, the torque control 32 is formed from spring steel.

Figure 4:
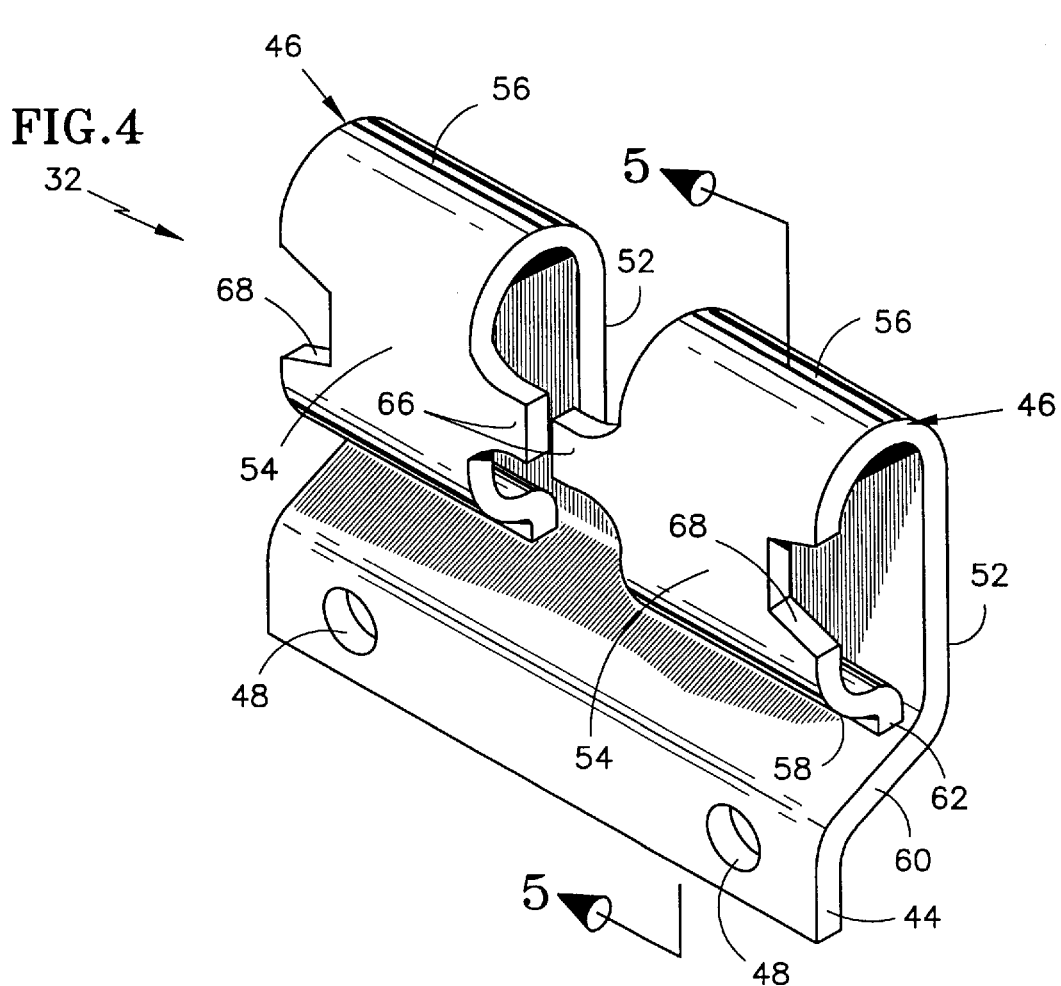
FIG. 4 is a rear perspective view of a preferred embodiment of the torque control for use with the visor assembly of the present invention.

Referring to FIG. 4, torque control 32 includes a flange 44 and two legs 46. The flange 44 is longitudinally extending and has two spaced holes 48. A plane of the torque control is designated by the flange. The two legs 46 are spaced apart from one another and extend from the edge of the flange 44 at opposite ends thereof.

Figure 5:
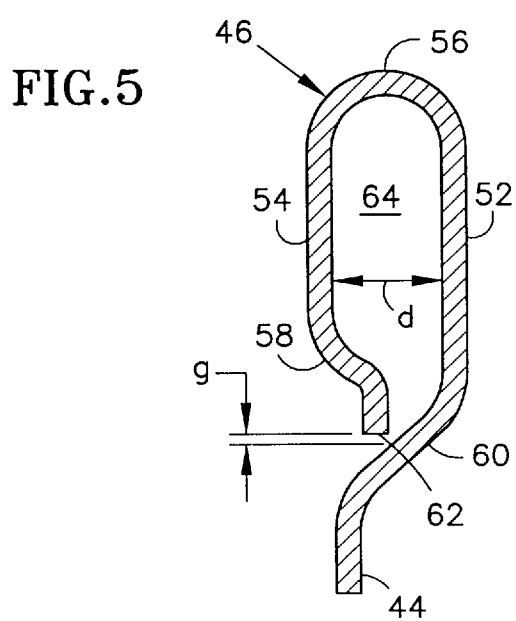
FIG. 5 is a cross-sectional view along line 5—5 in FIG. 4 of the torque control without a rod disposed therein.

Referring to FIG. 5, each of the legs 46 has a substantially elliptical cross-sectional shape. The cross-sectional shape includes a first sidewall 52, a second sidewall 54, an upper concave portion 56, a lower concave portion 58, an angled portion 60, and end portion 62. The first and second sidewalls 52 and 54 are substantially parallel to the flange 44 and spaced from one another. The upper portion 56 is curved and connects the first and second sidewalls. The lower portion 58 is curved toward the first sidewall 52.

The angled portion 60 extends outwardly at an angle from the flange 44 to the first sidewall 52. The end portion 62 extends from the free end of the lower curved portion 58. The end portion 62 is substantially parallel to the flange 44. The free end of the end portion 62 is spaced from the angled portion 60 leaving a gap represented by the arrow g.

In other embodiments, the angled portion 60 and the end portion may be eliminated and the design of the control modified in order to be used with different visor body geometries.

A channel 64 is formed through each elliptical leg, between the first and second sidewalls. The distance between these sidewalls is represented by the arrow d. The torque control should be formed to operate as a functional hinge, so that the rotational axis of the rod cannot move during use.

Referring to FIG. 4, the second sidewall 54 of each leg 46 includes an extension 66 longitudinally extending from the inner edges of each second sidewall 54. The extensions 66 extend between the legs 46. Each second sidewall 54 also includes a cutout 68 extending inwardly from the outer edges of each second sidewall 54.

The torque control 42 is cut from a sheet of SAE 1070 or 1095 spring steel with a thickness of from 0.9 to 1.1 mm, and bent to the desired shape. The material is heat treated to a Rockwell hardness of from 47 to 49. The dimensions of the features are experimentally determined and depend on the predetermined visor system thickness, the rod's dimensions, the material used, and the force requirements. A conventional lubricant should be used. The lubricant should work at high and low temperatures.

Referring to FIGS. 2 and 3, the guide 34 has a substantially H-shaped cross section. The H-shaped guide 34 includes a first leg 70 joined to a second leg 72 by a cross bar 74. The guide in another embodiment can be a T-shaped extension. The first and second legs are spaced and parallel to one another. The free end of the second leg 72 is attached to the base 44 of the torque control 32 using conventional fasteners (not shown), such as rivets. The fasteners extend through the holes 48 in the torque control. The guide 34 is formed by injection molding from nylon or other suitable plastics.

Referring to FIG. 2, the visor body 26 includes a channel 76, a bore 78, a cutout 80, a pin 82, a slide track 84, and a projection 86. The visor body 26 is substantially rectangular with the channel 76 longitudinally extending along a portion of the top edge of the visor body. When cloth or the like (not shown) is wrapped around the visor body the channel 76 is enclosed.

The bore 78 extends longitudinally through the upper portion of the visor body between the channel 76 and the front edge 88. In this embodiment, the bore 78 is formed by a conventional arrangement of a plurality of curved arms 90. The arms 90 alternately form lower and upper curved surfaces of the bore. During movement of the visor body between the stored and lowered positions the arms 90 act as a hinge. The bore 78 is dimensioned such that the visor body 26 slides smoothly over the rod 30 during lateral movement of the visor body.

The cutout 80 is U-shaped and formed within the top edge of the visor body 26 between the channel 76 and the rear edge 92. The pin 82 extends longitudinally across the cutout 80. Referring to FIG. 1, the vehicle 10 includes a bracket (not shown). This bracket is located adjacent the windshield 12 and spaced from the elbow bracket 28. When the pin 82 is secured within the bracket (not shown) the visor 26 is retained along the windshield 12 either in the stored position or the lowered position.

Referring to FIGS. 2 and 3, the slide track 84 is integrally formed on the upper surface 94 of the visor body. The slide track 84 includes a first vertical wall 96, a second vertical wall 98 spaced from the first vertical wall 96, a horizontal wall 100, and an opening 102.

The first and second vertical walls 96 and 98 extends from the upper surface 94 of the visor body. The horizontal wall 100 joins the first and second vertical walls 96 and 98. A ridge 104 extends from the first vertical wall 96. The horizontal wall 100 is substantially parallel to and spaced from the surface 94 of the visor body, so that substantially enclosed passage 106 is formed therebetween. The surface 94 of the visor body may be the back of a mirror frame assembly in some applications. The passage 106 extends longitudinally along a portion of the visor body adjacent the surface 94. The passage is shaped to receive a portion of the guide 34 in a sliding engagement. The horizontal wall 100 includes a partially longitudinally extending slot 108.

The opening 102 is formed at the free end of each of the walls. The walls are shaped so that they are angled at the opening 102 thus forming lateral and vertical lead-ins into the passage.

The projection 86 extends from the upper surface 94 of the visor body. The projection is wedge shaped angled upwardly from the rear edge 88 toward the forward edge 92. Thus the projection 86 includes a vertical surface 110, which is aligned with the opening 102 of the track 84.

The visor body and all of its components may be integrally injection molded from ABS plastic or other suitable plastics that have the appropriate properties for an automotive environment.

Assembly will now be discussed with reference to FIGS. 2 and 3. The guide 34 is inserted into the track 84, so that the first leg 70 is within the passage 106. The angled free ends of the track walls guide the guide 34 into the passage 106 vertically and laterally. The rod 30 is then inserted through the visor body bore 78. Thus, the rod 30 extends into the channel 76. The metal insert 36 is passed through the channels 64 of the torque control 42 (as shown in FIGS. 4 and 5) until the lobe (not shown) is between the legs 46 in the cutout. This prevents the torque control 42 from moving upon the rod 30. Thus the torque control 42 is partially within the channel 76. The guide 34 and the torque control 42 are fastened together using the holes 48 and conventional fasteners such as rivets. This may require that holes be drilled into the guide and the visor body.

Assembly of the visor using conventional methods will now be discussed. A cover cloth and foundation paper are cut larger than the visor body 26. The foundation paper and the cover cloth are laid in a butterflied, open position with a symmetric configuration about a centerline fold. The cover cloth is folded along the edges of the foundation paper. The openings for the pin 82 and the mirror are cut, if required, into the cover assembly. The center pin opening is core folded and a sealing aid is applied to the cover assembly. The sealing aid used will depend on the cloth used. In some applications it may not be necessary. The cover assembly is prefolded along the centerline fold, then the visor body is inserted therein. The cover is dielectrically sealed about the visor body. Then the mirror is attached to the visor.

Use of the visor assembly will now be discussed with reference to FIGS. 1, 6, and 7. The visor body 26 is lowered from the stored position to the lowered position and pivoted to the lowered position adjacent the side window 20.

The visor body 26 can be moved from the lowered retracted position (as shown in FIG. 6) to the lowered extended position (as shown in FIG. 7), as illustrated by the arrow A, by moving the visor body 26 away from the A-pillar 18. Moving the visor body 26 causes the bore 78 to slide along the rod 30, and the track 84 to slide along the guide 34. The guide 34 guides the visor body during lateral movement. Since the plastic visor body is in a sliding interface with the plastic rod cover 38, friction is low and wear is minimized. The visor can be located at various positions along the length of the rod 30 depending on the position of the sun. The projection 86 acts as a stopping means in cooperation with the guide to limit the lateral extension of the visor body by engaging the guide with the vertical wall 110 of the projection.

The principal advantage of the present invention is that the sliding visor provides a simple design which is easy to manufacture and assemble. The design also minimizes vibration and rattling due to sizing the guide and the track such that these phenomenon are minimized. An additional advantage of the present invention is that the only exposed plastic required is that covering the rod. This design also does not require a metal extrusion for the torque control to rest within. This also makes the design versatile so that it can be used with a variety of different size and shape visors.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. These modifications include, but are not limited to, modifying the shape of the guide and the track. The guide and passageway can be any shape, so long as together the guide and track accomplish the sliding function reliably. The friction provided by these parts should be enough to minimize rattle and excessive movement between these parts. The torque control may be modified so that a simpler or more complex clip is used depending on the application. The formation of the bore in the visor body can be modified so that the alternating arms are not used. This sliding visor concept can be used with any other type of visor construction, such as a two-piece visor body. It is therefore contemplated that the appended claims will cover any such modification or embodiments that fall within the true scope of the invention.

We claim:

1. A sliding sun visor assembly comprising:
    a rod assembly including
        a longitudinally extending rod;
        a torque control pivotally attached to said rod, and
        a guide fixed to one surface of said torque control, said guide having a substantially H-shaped cross section; and
    a visor body including
        a longitudinally extending bore for receiving said rod, and
        a longitudinally extending track, said track forming a substantially enclosed longitudinally extending passage adjacent one surface of said visor body, said passage being shaped to receive a portion of said guide in a sliding engagement; whereby upon moving the visor body longitudinally along said rod, said track slides relative to said guide.

2. The sliding visor assembly of claim 1, wherein said track includes a first vertical wall extending from said surface of said visor body; a second vertical wall extending from said surface of the visor body, said second vertical wall being spaced from said first vertical wall; and a horizontal wall substantially parallel to said surface of the visor body, said horizontal wall extending between the first and second walls and being spaced from said surface of said visor body such that said passage is formed therebetween, said horizontal wall including a partially longitudinally extending slot.

3. A sliding sun visor assembly comprising;
    a rod assembly including a longitudinally extending rod, a torque control pivotally attached to said rod, and a guide fixed to one surface of said torque control; and
    a visor body including a longitudinally extending bore for receiving said rod, and a longitudinally extending track, said track forming a substantially enclosed longitudinally extending passage adjacent one surface of said visor body, said passage being shaped to receive a portion of the guide in a sliding engagement whereby upon moving said visor body longitudinally along said rod, said track slides relative to said guide, said track further including a first vertical wall extending from said surface of said visor body, a second vertical wall extending from said surface of said visor body, said second vertical wall being spaced from said first vertical wall, and a horizontal wall substantially parallel to said surface of said visor body, said horizontal wall extending between said first and second walls and being spaced from said surface of said visor body such that said passage is formed therebetween, said horizontal wall including a partially longitudinally extending slot.

4. A sliding sun visor assembly comprising:
    a rod assembly including a longitudinally extending rod, a torque control pivotally attached to said rod, and a guide fixed to one surface of said torque control; and
    a visor body including a longitudinally extending bore for receiving said rod, and a longitudinally extending track, said track forming a substantially enclosed longitudinally extending passage adjacent one surface of the visor body, said passage being shaped to receive a portion of the guide in a sliding engagement whereby upon moving said visor body longitudinally along said rod, said track slides relative to said guide, said guide further including a first leg coupled to said torque controls, a second leg, and a cross bar joining said first leg to said second leg, such that said legs are spaced and parallel to one another, wherein upon assembly said second leg is received within said passage and said cross bar extends through a slot formed within said track.

* * * * *